(12) United States Patent
Chen

(10) Patent No.: US 7,104,557 B2
(45) Date of Patent: Sep. 12, 2006

(54) FOLDING AND POSITIONING STRUCTURE OF THE HEAD TUBE FOR AN ELECTRIC VEHICLE

(76) Inventor: Yung Cheng Chen, No. 7, Lane 398, Hung Chang 12th St. Chung Shan Li, Tao Yuan City (TW)

( * ) Notice: Subject to any disclaimer, the term of this patent is extended or adjusted under 35 U.S.C. 154(b) by 0 days.

(21) Appl. No.: 11/035,441

(22) Filed: Jan. 14, 2005

(65) Prior Publication Data

US 2006/0086558 A1   Apr. 27, 2006

(30) Foreign Application Priority Data

Oct. 26, 2004   (TW)   ............................... 93216991 U

(51) Int. Cl.
*B62D 1/18*   (2006.01)
(52) U.S. Cl. ................. 280/87.041; 180/65.1
(58) Field of Classification Search .............. 180/65.1, 180/180, 181, 208, 907, 908, 216, 220, 221; 280/87.041, 87.043, 87.042; 297/DIG. 4
See application file for complete search history.

(56) References Cited

U.S. PATENT DOCUMENTS

| | | | | |
|---|---|---|---|---|
| 4,570,739 A | * | 2/1986 | Kramer | 180/216 |
| 5,150,762 A | * | 9/1992 | Stegeman et al. | 180/208 |
| 5,388,659 A | * | 2/1995 | Pepe | 180/219 |
| 5,816,614 A | * | 10/1998 | Kramer et al. | 280/775 |
| 5,894,898 A | * | 4/1999 | Catto | 180/2.2 |
| 6,176,337 B1 | * | 1/2001 | McConnell et al. | 180/208 |
| 6,695,081 B1 | * | 2/2004 | Chu et al. | 180/65.1 |
| 6,866,109 B1 | * | 3/2005 | Roach | 180/65.1 |
| 2002/0139591 A1 | * | 10/2002 | Wisecarver | 180/65.1 |
| 2002/0170763 A1 | * | 11/2002 | Townsend | 180/220 |
| 2004/0129472 A1 | * | 7/2004 | Cheng | 180/181 |
| 2004/0256164 A1 | * | 12/2004 | Huang | 180/65.1 |
| 2005/0133282 A1 | * | 6/2005 | Huang et al. | 180/65.1 |

FOREIGN PATENT DOCUMENTS

WO   WO 94/17769   * 8/1994

* cited by examiner

*Primary Examiner*—J. Allen Shriver
(74) *Attorney, Agent, or Firm*—Egbert Law Offices

(57) ABSTRACT

An electric vehicle with an innovative folding and positioning structure of the head tube includes a head tube having a bottom connected to the top of a top tube through a movable joint, constituting the swivel part of the head tube. The top of the top tube has a ratchet edge in a circumferential design. The bottom of the head tube is installed with a ratchet block, being pulled up and down to joggle with or detach from the ratchet edge. A transmission shaft, pivoted and located in the slot of the head tube, can be shifted upward and downward. A positioning component, shifting downward through forcing the transmission shaft, enables the joggling between ratchet edge and ratchet block. An elastic component, which pushes upward the transmission shaft when the positioning component is in a release state, and then enables the detachment of ratchet edge from ratchet block.

4 Claims, 7 Drawing Sheets

FOLDING AND POSITIONING STRUCTURE OF THE HEAD TUBE FOR AN ELECTRIC VEHICLE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to an electric vehicle, and more particularly to an electric vehicle having a head tube with a folding and positioning structure.

BACKGROUND OF THE INVENTION

It has been noted that, compared with ordinary vehicles, electric vehicles have the advantages of environmental protection, low energy consumption, lightweight and easiness of operation. It has now gradually become a kind of transportation tool for many people. With the development up to now, its structures of each part have been gradually innovated and perfected due to the breakthroughs and improvements by the industry.

What the present invention tends to improve is the component of the head tube. Because it is an abrupt component of the whole vehicle body, more than half of existing electric vehicles have been designed with foldable head tubes, to save the cost of conveying electric vehicles and the labor of the users to carry the vehicles (to put them in a car) or to store and place them. However, generally speaking, for the folding structure of the existing head tube, the control mechanism is set at the spot of the folding joint that nears the bottom of the head tube. This requires the user to carry through such operation in a squatting posture, which is already inconvenient for common users. Moreover, since the users include a wide range of elders and disabled persons, the design mentioned above apparently causes more difficulties for them to operate and, subsequently, brings about the problems of inconvenient uses and insufficient functionality.

Hereby, it is clear to see, from the above discussion, the problems that exist in the folding and positioning structures of the head tube in an electric vehicle. Then, how to develop a type of new structure that is more convenient to operate and of more ideal practicality, indeed becomes the aim and direction that must be further studied and overcome by the concerned practitioners with further efforts.

In the light of this, the inventor, based on the experiences of designing and developing related products for many years, aiming at the above objective, after detailed design and cautious evaluation, ultimately obtained an invention of real practicability.

BRIEF SUMMARY OF THE INVENTION

The facts of improving functionality by the present invention follow.

The present invention provides an innovative structure of folding and positioning the head tube of an electric vehicle. It is composed of a ratchet edge, a ratchet block, a transmission shaft and elastic components, and is really the first seen design in this industry that meets the novelty requirement for new patents.

In this specially improved structure design, the positioning components can be on the top of the head tube through the upward stretching of the transmission shaft. Then, the user can easily operate it by hands in a standing posture, no longer in a squatting posture. Therefore, such a vehicle is easy to operate even for the elders or disabled persons and achieves the practical efficiency of easy operation, so it satisfies the progress requirement for new patents.

The movable joint of the head tube adopts the design of joggling between ratchet edge and ratchet block for positioning, which can achieve a rather stable position and help the switch between joggling and detachment.

Through the design of joggling between the ratchet edge and the ratchet block for positioning, the head tube can be flexibly adjusted to locate at multiple angles, and can meet the demands of the users of different stature and thus has better applicability.

The above is the detailed description of the technical characteristics of this invention based on the instance that is implemented quite well. However, experts familiar with this technique are allowed to change and modify this invention as long as they do not depart from the spirit and principle of this invention, but this change and modification should be confined in the following scopes defined by the applied patent.

DETAILED DESCRIPTION OF THE INVENTION

The features and the advantages of the present invention will be more readily understood upon a thoughtful deliberation of the following detailed description of a preferred embodiment of the present invention with reference to the accompanying drawings.

Figure 1:
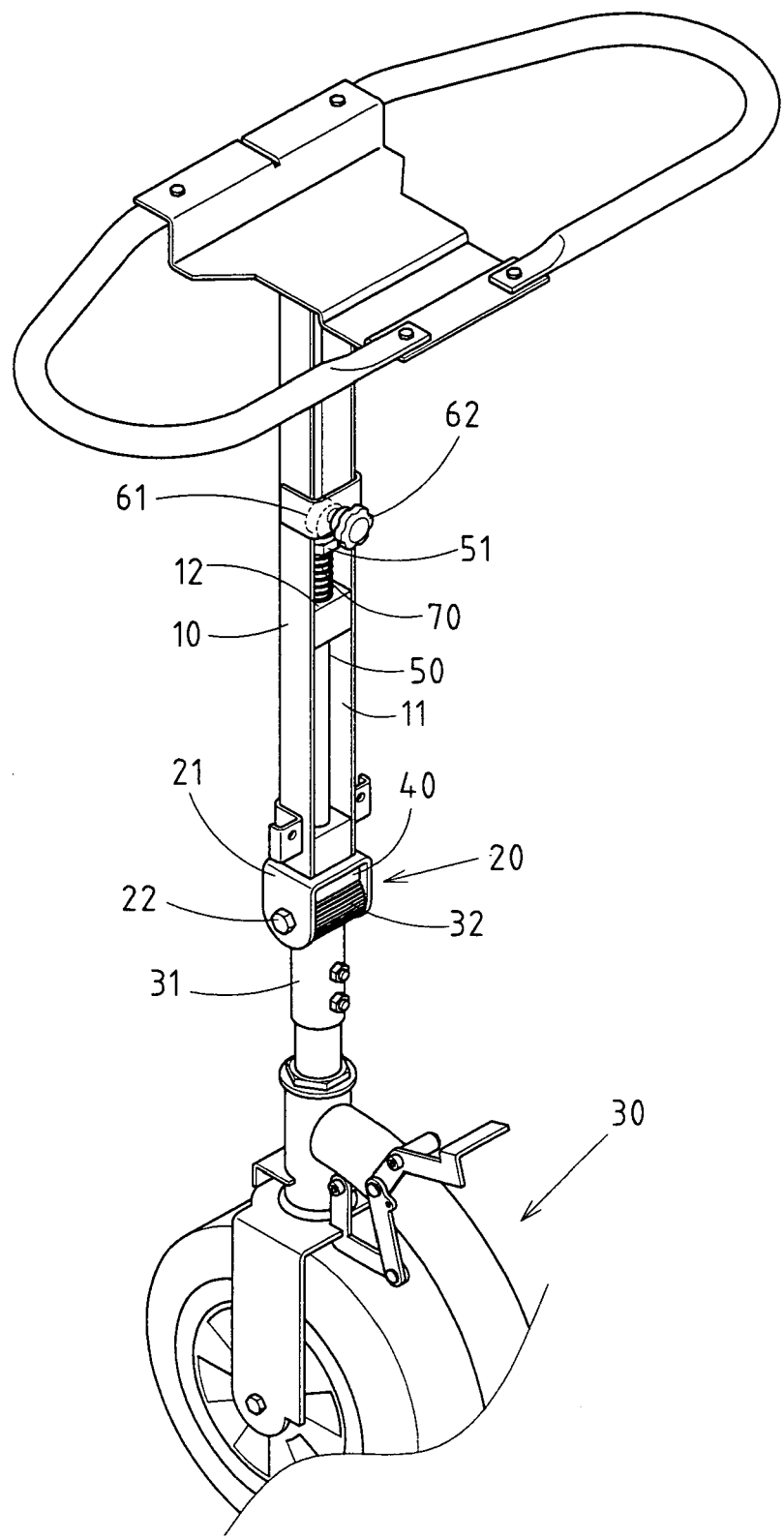
FIG. 1 shows a perspective view of the head tube in folding position.
Figure 2:
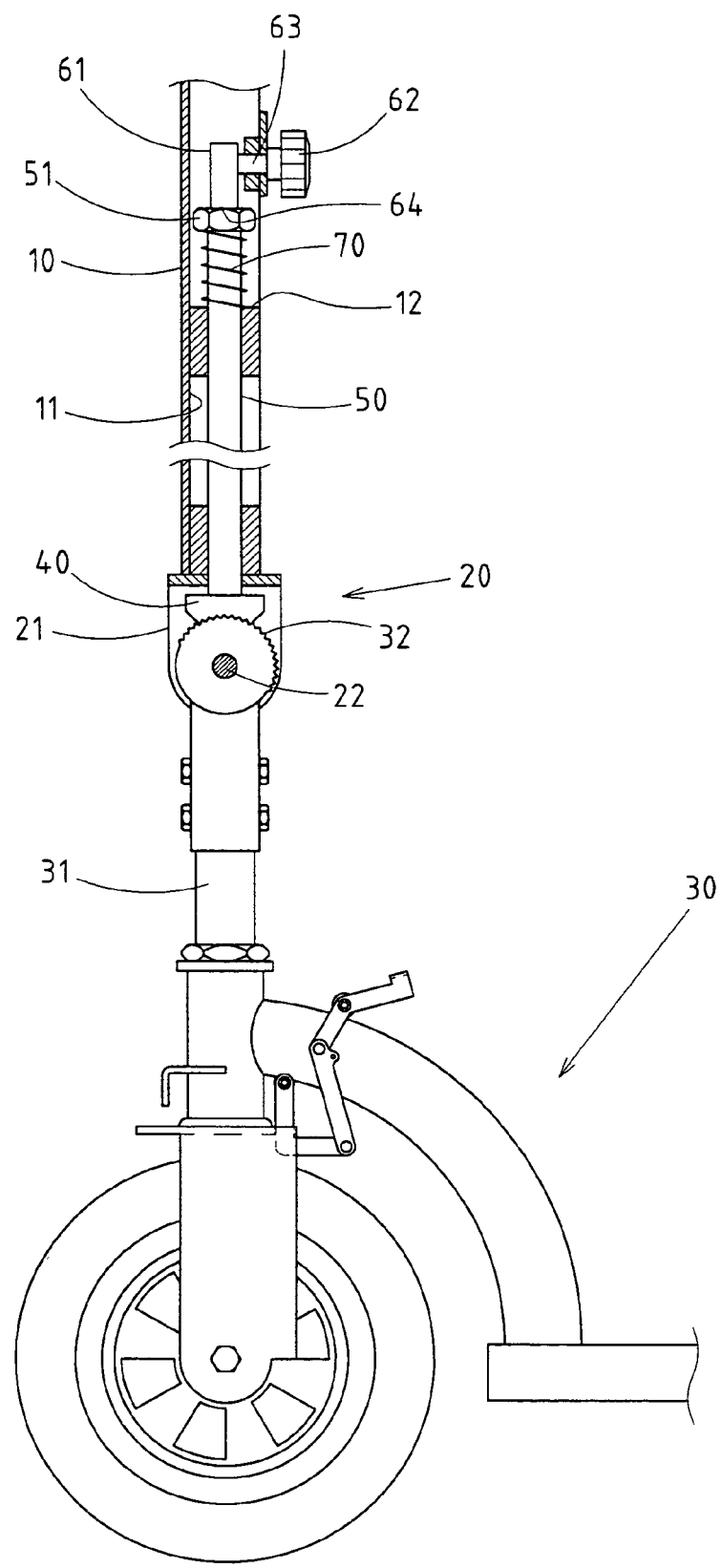
FIG. 2 shows a horizontal sectional view of the head tube in vertical folding position.
Figure 3:
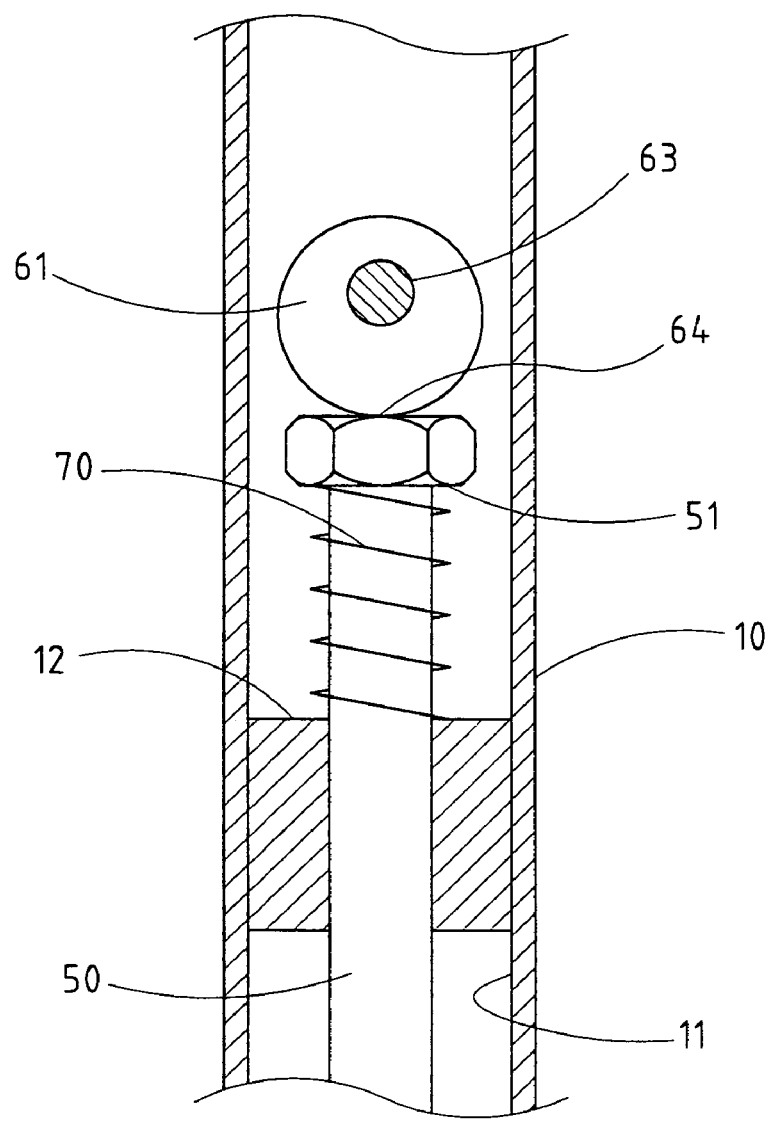
FIG. 3 shows a partial sectional view of the cam of the protrusion pushing down the transmission shaft in FIG. 2.
Figure 7:
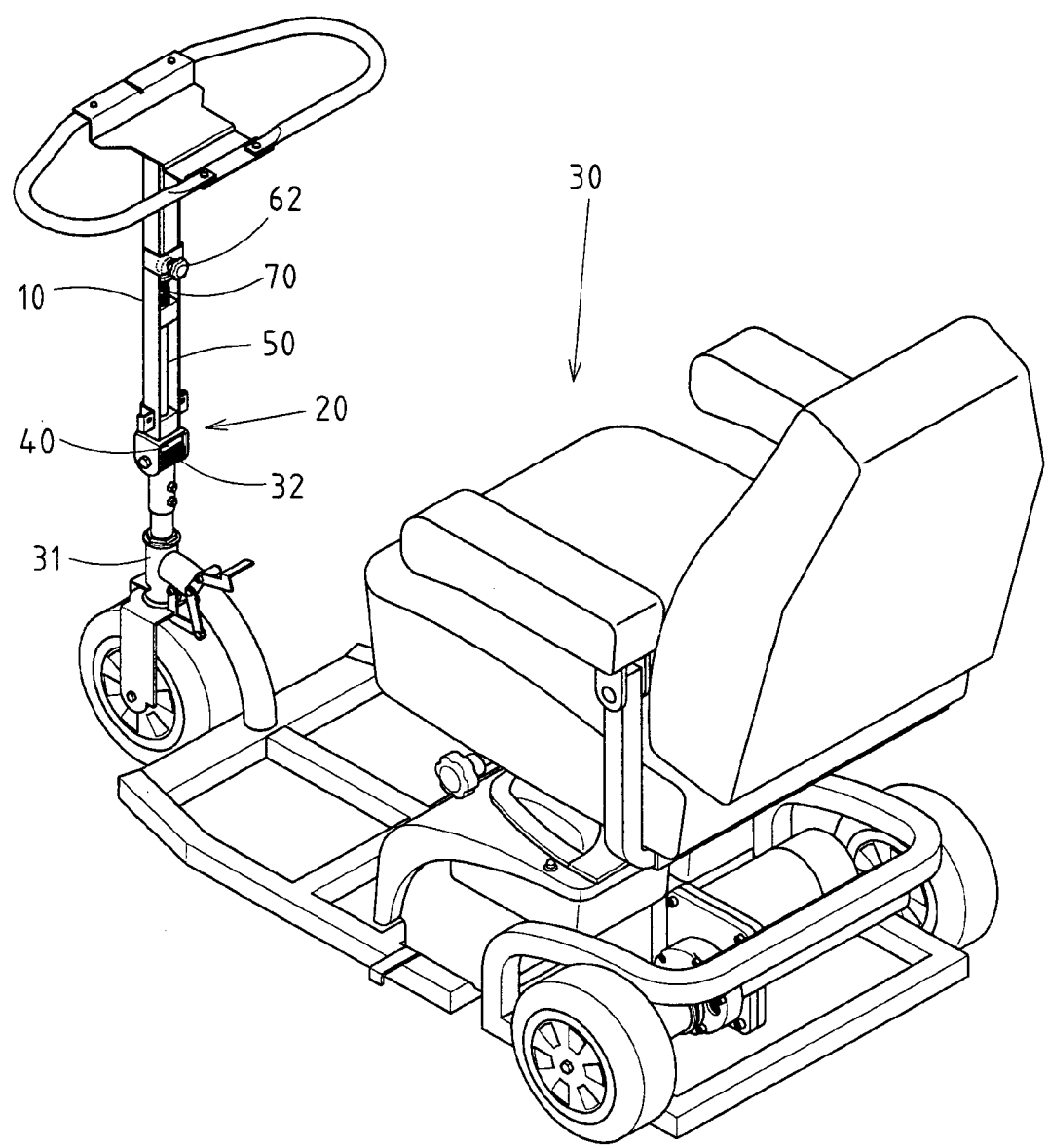
FIG. 7 shows an upper perspective view of the preferred embodiment of the present invention.

As shown in FIGS. 1–3, an electric vehicle with an innovative folding and positioning structure of the head tube embodied in the present invention comprises the bottom of the head tube 10, through a movable joint 20, being assembled on the top of the top tube 31 of the electric vehicle (refer to FIG. 7 for the overall structure), and enabling the head tube 10 to revolve and fold by taking the movable joint as a swivel pivot, and to further switch between the vertical operating status and the folded status.

The top of the top tube 31 has a ratchet edge 32 in a circumferential design.

The bottom of the head tube 10 is installed with a ratchet block 40, which can be pulled up and down, and then can be joggled with or detached from the previously mentioned ratchet edge 32.

A transmission shaft 50 is pivoted and located in the axially mounted slot of the head tube 10. The transmission shaft 50 can be shifted upward and downward, driven through the connection between the bottom of the rod and the top of the ratchet block 40, the top end of the transmission shaft 50 can be stretched upward till the predefined height.

A positioning component 60, through forcing the transmission shaft 50 to shift downward, enables the joggling status between the ratchet edge 40 and the ratchet block 32.

An elastic component 70 can push upward the transmission shaft 50 when the positioning component 60 is in the release state, and consequently enables the detachment of ratchet edge 40 from ratchet block 32.

Therein, the components and structures of the movable joint 20 can be implemented as follows: the bottom of the head tube 10 forms a ∩-shaped base 21, which can be fitted to the top of the top tube 31, and be pivoted with the top tube through a shaft bolt 22.

Therein, the positioning component 60 includes a cam 61 and a brake knob 62. This cam 61 is installed on the head tube 10 and appears to be able to swivel on the top of the transmission shaft 50 around its own center of circle. The center horizontally stretches out a shaft 63, outside which the brake knob 62 can be installed. In this way, turning the brake knob 62 can cause the cam 61 to swivel. When the protrusion 64 of the cam 61 faces down, the transmission shaft 50 will be driven to enable the joggling status between the ratchet edge 32 and the ratchet block 40. On the contrary, the ratchet edge 32 and the ratchet block 40 are detached from each other.

Therein, the elastic component 70 can be a spiral spring. An expanded blocking margin 51 in the present implementation is a nut set on top of the transmission shaft 50; correspondingly, a supporting surface 12 is set on top of the slot 11 in the head tube 10. The elastic component 70 is then installed between the expanded blocking margin 51 and the supporting face 12, and through elastic force it is able to push upward the transmission shaft 50.

Based on the above structure and component design, the folding and positioning structure for the head tube disclosed by this present invention has the following actuating scenarios.

Figure 4:
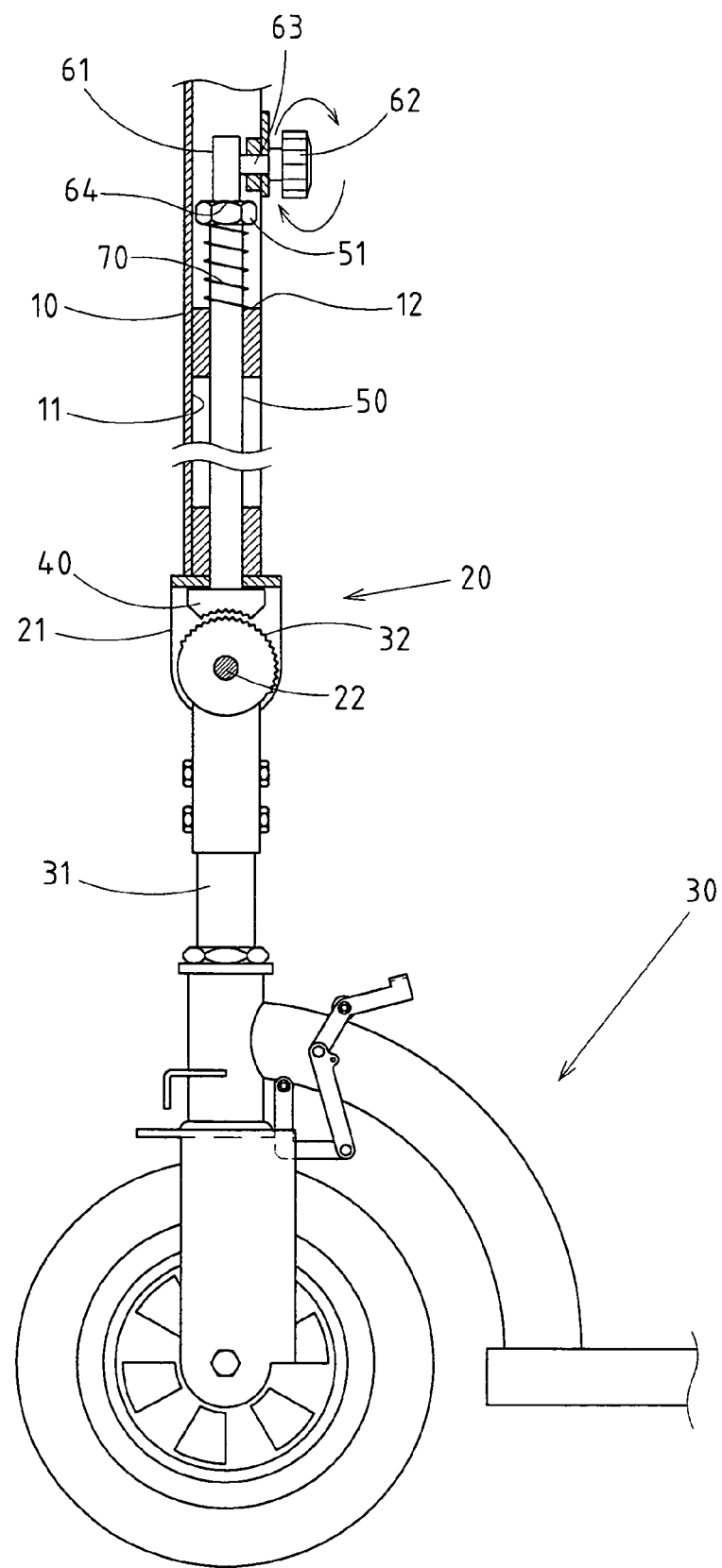
FIG. 4 shows a horizontal sectional view of the head tube when the ratchet edge and ratchet block are detached.
Figure 5:
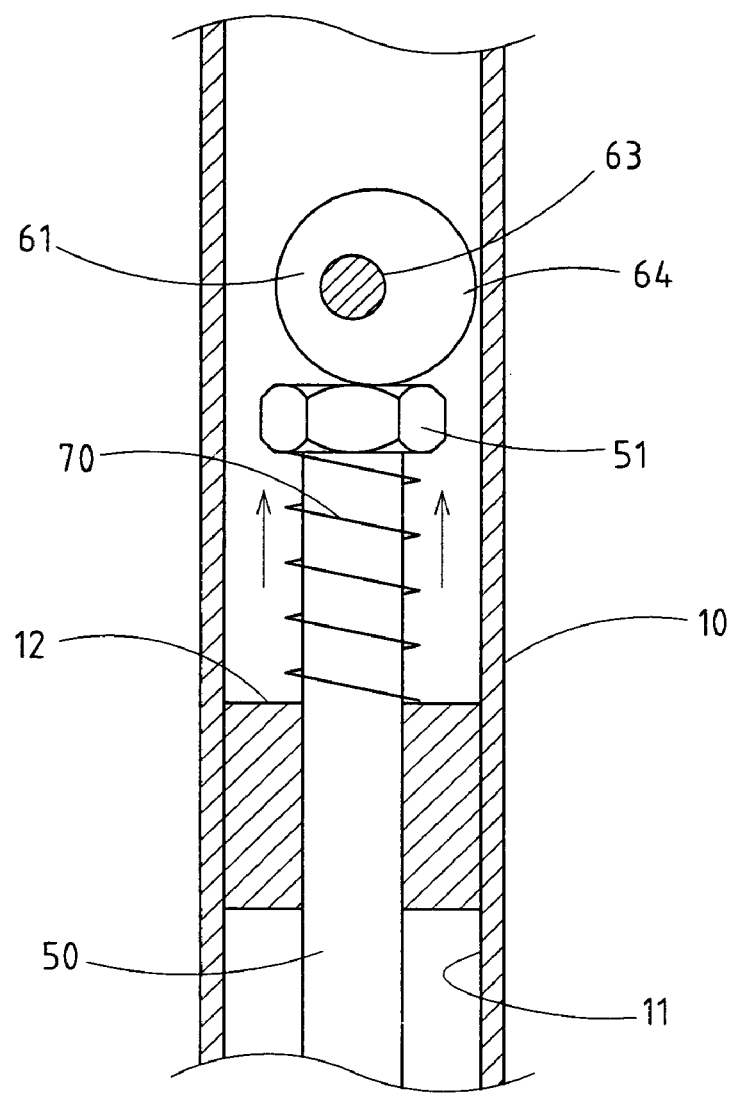
FIG. 5 shows another sectional view of the cam of the protrusion releasing the transmission shaft in FIG. 4.
Figure 6:
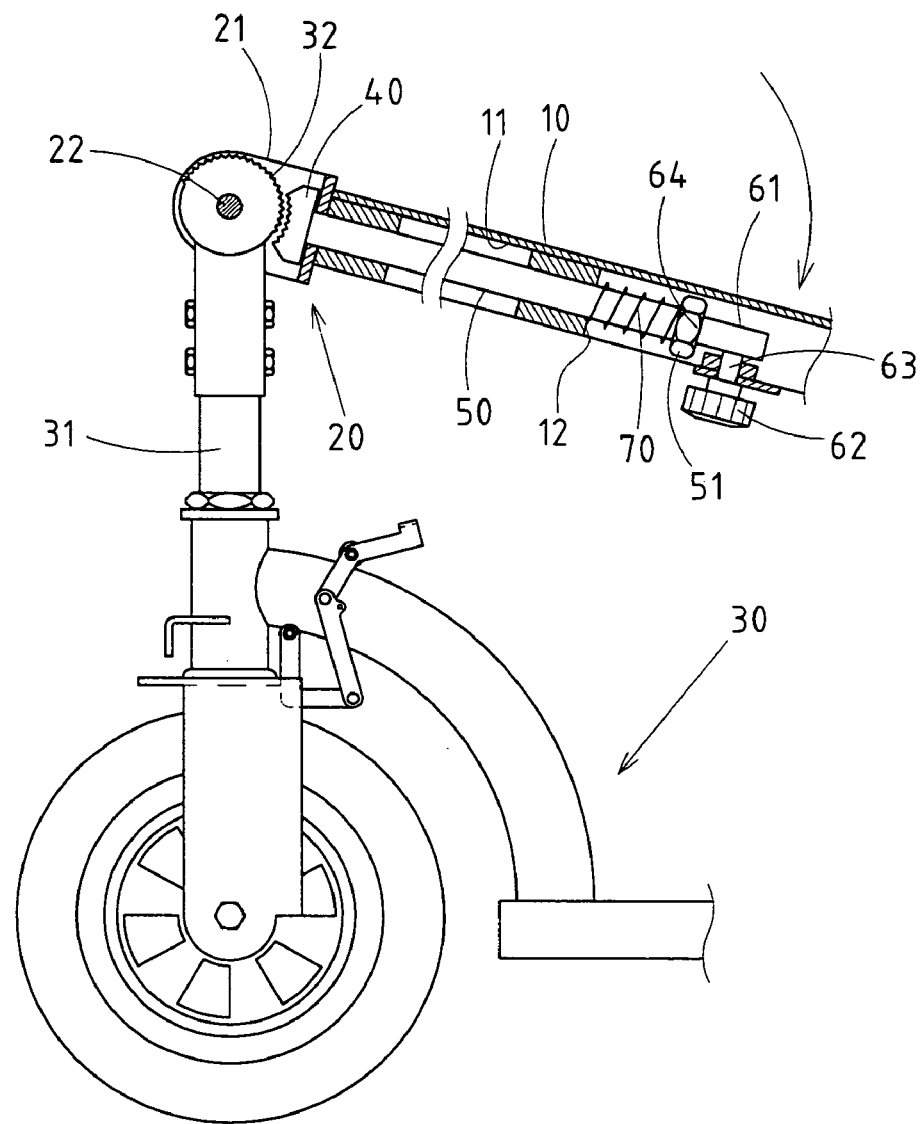
FIG. 6 shows another sectional view of the head tube in folding state in FIG. 4.

Therein, as shown in FIGS. 2 and 3, when the head tube 10 is in vertical operating state, the user can turn the brake knob 62 to drive the cam 61 to swivel, making the protrusion 64 face downward, which pushes down the transmission shaft 50 and further enables the engagement/joggling between the ratchet block 40 and the ratchet edge 32. Through this, the head tube 10 can be fixed. On the other hand, as the transmission shaft 50 is being pushed down, it presses the elastic component 70 and makes the elastic component accumulate spring force. If the user wants to fold the head tube 10, as shown in FIGS. 4 and 5, reversely turning the brake knob 62 to actuate the swivel of the cam 61, making the protrusion 64 shift upward, which releases the transmission shaft 50 from the state of being pressed. The transmission shaft 50 stays up due to the effect that the elastic component 70 releases its spring force, and makes the ratchet edge 32 and the ratchet block 40 detach from each other, such that the head tube 10 is free from restricted locations and can be folded (as shown in FIG. 6). When it is situated at a folded angle, it can be positioned again by reversely turning the brake knob 62. Through such positioning, design of the engagement of the ratchet block 40 and the ratchet edge 32, the head tube 10 can be positioned at any angle ranging from the right angle to the completely folded angle, which can better satisfy the requirements of users with different stature.

I claim:

1. An electric vehicle with a pivoting structure design for folding and positioning a head tube, said electric vehicle comprising:
    a bottom of the head tube, which through a movable joint is assembled on the top of a top tube of the electric vehicle, enabling the head tube to revolve and fold by making the movable joint as a swivel pivot;
    a ratchet edge, which is in a circumferential design around the top of the top tube;
    a ratchet block, which is assembled at the bottom of the head tube and can be pulled up and down to engage with or detach from the ratchet edge;
    a transmission shaft is pivoted and located in an axially mounted slot of the head tube; wherein the transmission shaft can be shifted upward and downward, driven through the connection between the bottom of the head tube and the top of the ratchet block, and the top of the transmission shaft can be stretched upward to a predefined height;
    a positioning component, through forcing the transmission shaft to shift downward, enables the engaging between the ratchet edge and the ratchet block; and
    an elastic component, which can push upward the transmission shaft when the positioning component is in release state, and consequently enables the detachment of the ratchet edge from the ratchet block.

2. The electric vehicle defined in claim 1, wherein the movable joint comprises: the bottom of the head tube forming a ∩-shaped base, which can be fitted to the top of the top tube, and be pivoted with the top tube through a shaft bolt.

3. The electric vehicle defined in claim 1, wherein said positioning component comprises a cam and a brake knob; wherein the cam is installed on the head tube and appears to be able to swivel on the top of the transmission shaft around its own center of circle, wherein the center horizontally stretches out a shaft, outside which the brake knob can be installed, wherein turning the brake knob can cause the cam to swivel, wherein, when the protrusion of the cam faces down, the transmission shaft is driven to enable the engaging status between the ratchet edge and the ratchet block.

4. The electric vehicle defined in claim 1, wherein said elastic component can be a spiral spring, wherein an expanded blocking margin is set on the top of the transmission shaft, wherein, correspondingly, a supporting surface is set on the top of the slot in the head tube, wherein the elastic component is then installed between the expanded blocking margin and the supporting surface, and through elastic force the elastic component is able to push upward the transmission shaft.

* * * * *